Oct. 2, 1934.  L. MARTINAGE  1,975,726
ENDLESS TRACK VEHICLE
Filed Aug. 8, 1932  2 Sheets-Sheet 1
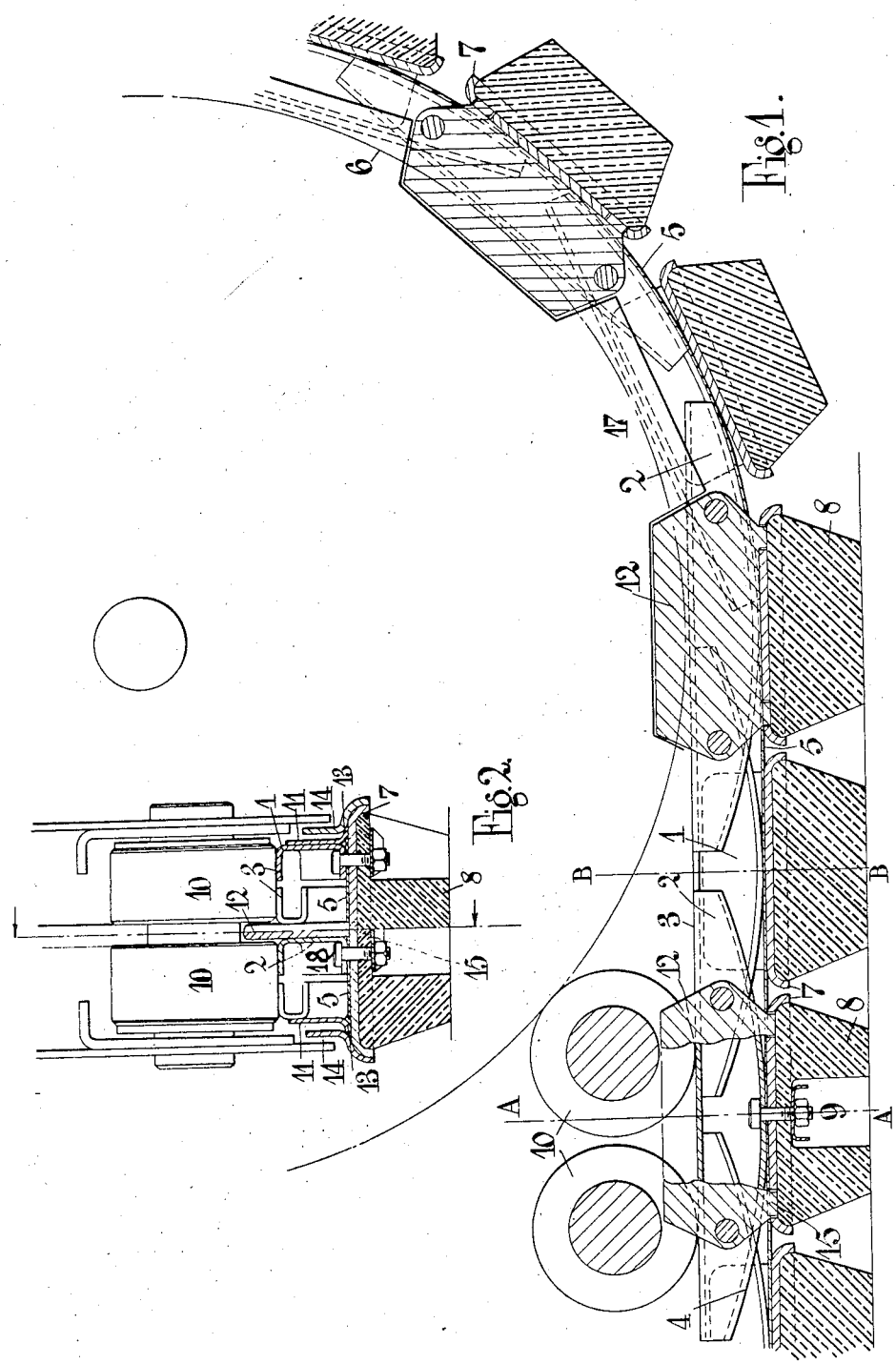

Oct. 2, 1934.  L. MARTINAGE  1,975,726
ENDLESS TRACK VEHICLE
Filed Aug. 8, 1932  2 Sheets-Sheet 2
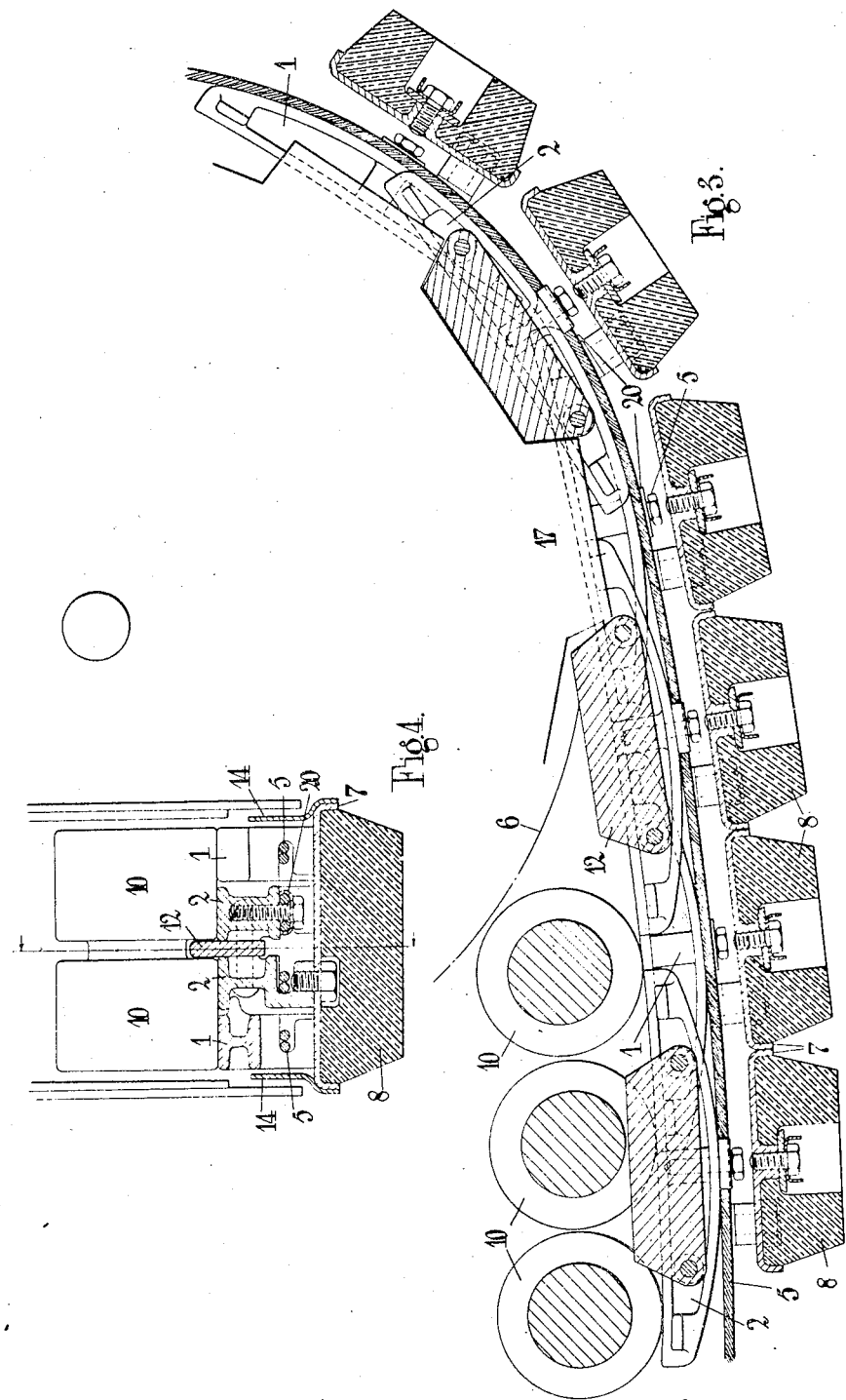
L. Martinage
INVENTOR
By: Marks & Clark
Attys.

Patented Oct. 2, 1934

1,975,726

UNITED STATES PATENT OFFICE 1,975,726

ENDLESS TRACK VEHICLE

Léon Martinage, Paris, France

Application August 8, 1932, Serial No. 627,966
In France September 15, 1931

6 Claims. (Cl. 305—9)

This invention relates to vehicles of the self-laying track type and to endless tracks for the same, and consists in improvements in or modifications of the invention covered in my prior U. S. patent application No. 545,338, filed the 18th day of June, 1931, and in such invention as modified by U. S. patent application No. 546,645, filed the 24th day of June, 1931.

The application No. 545,338 describes an endless band track for all vehicles drawn mechanically or by animals, for mechanical conveyors or other uses, which is rigid in one direction and flexible in the other. The characteristic feature of such track band consists in the fact that the chain links and the rollers are so combined that the chain becomes momentarily rigid when it bears upon the track, the links being assembled as desired by pins or a flexible band.

The present invention consists in improvements in the main invention and in such invention as modified by U. S. patent application No. 546,645, filed the 24th day of June, 1931, which improvements are more specifically pointed out in the claims and will be described hereinafter with reference to the accompanying drawings, which illustrate by way of example two embodiments of the improved chain according to the present invention.

Figure 1 shows a longitudinal section through one form of chain.

Figure 2 is a cross section, made up of two half sections taken along the lines A—A and B—B in Figure 1 respectively.

Figures 3 and 4 are similar views of a modified form of chain.

The chain according to the present invention possesses the same features of momentary rigidity as the chain which forms the subject of application 545,338. This momentary rigidity is obtained from the fact that the distance between the axes of two consecutive rollers is less than the pitch of the chain.

The links, such as 1 and 2, differ in construction from those employed in the embodiment forming the subject of application 545,338 in that, on the track side of the rollers, they have a form 3, as shown in the drawings, while on that surface adjacent the inner side of the flexible band 5 they have a convex curvilinear form 4.

The radius of this curve is chosen in such a way that, where the band runs over the pulley 6, the profile of the band over the outer side or face of the links will be circular and concentric with the pulley instead of having the polygonal profile which is produced when the band is wound in the manner described in application 545,338 as modified by U. S. patent application No. 546,645, filed the 24th day of June, 1931.

The links are connected together, as in the specification of U. S. patent application No. 546,645, filed the 24th day of June, 1931, by means of one or more flexible bands 5 or cables which may be formed of any suitable material. For example, they may be formed of relatively thin metal or of leather, balata, rubber, cotton, camel hair, metallic cable or some other combination of flexible materials.

The links such as 1 and 2 overlap one another and the lower face 4 of each link presses upon the flexible band 5 to which the track blocks 8 are secured by means of sole plates or shoes 7, the whole arrangement being assembled by means of bolts 9.

The upper or inner face 3 of the links 1 and 2 bears upon the track rollers 10. These links are formed of simple iron sections as shown in the drawings permitting the number of links required for the given size of chain to be reduced to the greatest possible extent.

The single point attachment of the links provided by the bolts 9, combined with the existence of the curved part 4 adapted to provide a bearing surface for the bands 5 when the chain runs over the pulley, permits the links to rock on the plates 7.

In order to avoid this rocking motion, lateral supports are provided and may be constructed in a single piece or of a plurality of elements.

In the example illustrated in Figures 1 and 2, the outer links 1 are prevented from rocking by lateral plates 11 fixed upon these links. The inner links which are attached to guide links 12 as explained hereinafter, are prevented from rocking by such guide links which bear upon the sole plate.

In the example illustrated in Figures 3 and 4 the protection against rocking and lateral pivoting is obtained by securing the links directly to the sole plates.

Independently of the tendency of the links to rock in the longitudinal direction (Figure 1), it is essential to prevent them from pivoting laterally about the bolt 9, as this would cause the links to abut against each other.

For this purpose the links are held in a parallel relationship to each other by suitable means. In the case of the outer links, this result is obtained by means of a flange 13 on the plate 11 which bears upon the mud shields 14 welded upon the sole plate 7. As regards the inner links, these are connected together back to back in pairs on the guides 12 and they are held upon the sole plates, by bolts 18. Further, in order to prevent any lateral turning of the guide link the latter may comprise two pins 15 situated at the ends of its base, and engaged, during assembly, in suitable apertures provided in the sole plates 7.

The guide links 12, mentioned above, are adapted to guide the chain. Each comprises a metal part 12 projecting above the faces 3 of the links and bearing upon the inner faces of the track rollers 10. Each guide link is held to and between its companion inner links by bolts, rivets or welding.

The flexible parts may be mounted on each link in another manner, as shown in Figures 3 and 4. They may be mounted at the center of each link in an independent manner by means, for example, of bolts which pass through each band element, or else by assembling one or more parallel elements by nipping or pressing, use being made of cable connectors or clips 20, or other analogous devices.

The links may also be attached directly at their lower part to the sole plate. In this case the necessary clearance will be left between the convex face of the link and the upper face of the sole plate, for the lodgment of the flexible band, or of the cables, and the members for attaching it to the links (see Figures 3 and 4).

In the case of a direct drive the chain, which is then a driving chain, may be driven for example by means of the guide links, the edges of which engage with the teeth 17 (Figure 1) of the driving wheel or pulley 6. The lateral stresses due to the rolling motion are transmitted directly from the track blocks 8 and the plates 7 to the rollers 10, by means of the guides 12, without subjecting the flexible band 5 to the action of any of these forces.

The chain operates in the same manner as that described in application 545,338 but, in view of the fact that the flexible band runs continuously and in a circular form over the pulleys, it is subjected to much less fatigue on account of the fact that the bending of this band into a polygonal shape is avoided, thus giving it a longer life.

The arrangement according to the present invention also has the advantage of requiring no lubrication, while machining and mounting are simplified and the weight of the chain is reduced so that a higher speed can be obtained.

Having now described my invention, what I claim as new and desire to secure by Letters Patent is:—

1. An endless track system for vehicles comprising in combination an endless flexible band, a plurality of links secured to said band with their ends in overlapping relationship, load supporting rollers adapted to bear upon the inner surfaces of said links, the distance that the links overlap being approximately the distance between the centers of two successive rollers, the link surfaces being smooth and unobstructed so as to permit of a free passage of the links past said rollers and the distance between the axes of two consecutive rollers being less than the pitch of the chain constituted by said links, and a wheel for guiding the endless track formed by said flexible band and said links, the outer surfaces of the latter which engage with said flexible band being of continuous convex curvature so that the said band may become truly concentric with the said wheel as it passes around it.

2. An endless track system for vehicles comprising in combination, an endless flexible band, a plurality of links each secured to said band at a single point, said links being arranged with their ends in overlapping relationship, pins pivotally connecting said links and the extent of each overlap being at least equal to half the pitch of the chain constituted by said links, load supporting rollers adapted to bear upon the inner surfaces of said links, these surfaces being even so as to permit of a completely unobstructed passage of the links past the rollers and the distance between the axes of two consecutive rollers being less than the pitch of said chain, a wheel for guiding the endless track formed by said flexible band and said links, the outer surfaces of the latter which engage with said flexible band being of continuous convex curvature so that the band may become truly concentric with the said wheel as it passes around same, and means for maintaining said links in correct alignment for engagement with said load supporting rollers and with said wheel and for preventing relative rocking motion between said links and said flexible band about the single point attachments of the links to the band.

3. An endless track system for vehicles comprising in combination, an endless flexible band, a plurality of links each secured to said band at a single point, said links being arranged with their ends in overlapping relationship, pins pivotally connecting said links and the extent of each overlap being at least equal to half the pitch of the chain constituted by said links, load supporting rollers adapted to bear upon the inner surfaces of said links, these surfaces being even so as to permit of a completely unobstructed passage of the links past the rollers and the distance between the axes of two consecutive rollers being less than the pitch of said chain, a wheel for guiding the endless track formed by said flexible band and said links, the outer surfaces of the latter which engage with said flexible band being of continuous convex curvature so that the band may become truly concentric with the said wheel as it passes around same, plate members secured to the outside of said flexible band and adapted to carry tread shoes for the endless track and means for maintaining said links in correct alignment for engagement with said load supporting rollers and with said wheel and for preventing relative rocking motion between said links and said flexible band about the single point attachments of the links to the band.

4. An endless track system according to claim 3 wherein said means for maintaining correct alignment of the links and preventing rocking motion thereof on the flexible band comprise other plate members associated with the links and arranged to bear upon the said plate members which carry the tread shoes of the track.

5. An endless track system according to claim 3 comprising mud shields connected at the sides of said plate members which carry the track tread shoes and wherein said means for maintaining correct alignment of the links and preventing rocking motion thereof on the flexible band comprise other plate members associated with the links and arranged to bear upon the said plate members which carry the tread shoes of the track and also bear against said mud shields.

6. An endless track system for vehicles comprising in combination, an endless flexible band, a plurality of links secured along the length of said band and in laterally disposed pairs, said links being arranged with their ends in overlapping relationship and each pair of links comprising an inner link and an outer link, a central guide member having the inner links of each pair secured on opposite sides thereof, load bearing rollers adapted to bear upon the pairs of links on each side of said guide member, the latter being formed to pass between these rollers, the distance between the axes of two consecutive rollers being less than the pitch of the chain constituted by said links, plate members secured to the outside of said flexible band and adapted to carry tread shoes for the track, mud shields fitted at the sides of said plate members, other plate members secured at the sides of said outer links of each pair and adapted to bear against said mud shields so as to prevent rocking motion of these links upon the flexible band, means in association with said central guide member for keying same to said plate members which carry the track tread shoes, a wheel for guiding the track and means for securing each link to the inside of said flexible band at a single point, said links having the surfaces thereof which engage with said band of continuous convex curvature so that the band may become truly concentric with the said wheel as it passes around same.

LÉON MARTINAGE.